United States Patent [19]

Cohen et al.

[11] 4,097,302

[45] Jun. 27, 1978

[54] FLATTING AGENTS

[75] Inventors: Howard Joseph Cohen; Francis Michael Vojik, both of Baltimore, Md.

[73] Assignee: SCM Corporation, New York, N.Y.

[21] Appl. No.: 658,276

[22] Filed: Feb. 17, 1976

[51] Int. Cl.$^2$ .......................... C09C 3/10; C09C 7/12; C09D 5/00; C09D 7/02
[52] U.S. Cl. .................................. 106/312; 106/272; 106/308 B; 260/28.5 A
[58] Field of Search .............. 106/272, 288 Q, 308 Q, 106/308 M, 309, 312; 260/28.5 A

[56] References Cited

U.S. PATENT DOCUMENTS

| 2,504,270 | 4/1950 | MacLaren | 260/28.5 A |
| 2,601,109 | 6/1952 | Fish | 260/28.5 A |
| 3,816,154 | 6/1974 | Baldyga | 106/272 |

Primary Examiner—Joan E. Welcome
Attorney, Agent, or Firm—A. Joseph Gibbons

[57] ABSTRACT

Silica flatting agents having improved flatting and settling characteristics and which impart improved mar resistance to certain coatings are prepared by treating a silica hydrogel in the absence of dispersion or emulsifying agents with up to 14 parts by weight of specific mixtures of microcrystalline waxes and synthetic waxes in the respective ratios of from 1:1.5 to 1:12.

8 Claims, No Drawings

FLATTING AGENTS

The present invention relates to an improvement in the dry process for preparing silica flatting agents and the product obtained thereby.

The prior art discloses essentially two types of wax treated silicas useful for flatting agents. Young, in U.S. Pat. No. 2,856,268 teaches a flatting agent produced by co-milling a silica-hydrogel and a microcrystalline wax in a fluid energy mill, the wax content of the resultant product being in the order of 15–30 weight percent. U.S. Pat. No. 3,607,337 (Eisenmenger et al.) teaches a flatting agent prepared by a process significantly different from the Young dry method process, namely the treatment of an aqueous dispersion of silica acids, gels or silicates with an aqueous emulsion or dispersion of wax, including thermoplastic materials, to give a treated silica with total wax content of from 0.5 to 15 weight percent.

Other less pertinent art is shown in German Pat. No. 1,059,134 which teaches the use of fine crystals of polyethylene for flatting purposes and German Pat. No. 1,246,919 which is described as removing the deficiencies of the first noted German patent by substituting for the crystalline polyethylene a type of milled polypropylene flatting agents. More recently, U.S. Pat. No. 3,883,458 (Mueller, Klug, Bronstect and Grah) teaches a flatting agent obtained by reacting a polyolefin wax under free radical polymerization with vinyl aromatic compounds and a co-polymerizable α-β-olefinically unsaturated dicarboxylic anhydride, some of which may be replaced by one or more α-β-olefinically unsaturated monocarboxylic acids.

The present process differs significantly from the Young dry method in that it allows for the substitution of a major portion of the wax used by Young with a minor proportion of a synthetic wax affording a product with equal or improved flatting characteristics and markedly improved suspension or settling characteristics. That the product obtained is substantially different from the prior art product is supported by a direct comparison in the best mode Examples. The reason for such marked improvement is not well understood from the physical properties and/or method of preparation used.

One object of the present invention relates to a dry process for producing a silica flatting agent wherein a silica hydrogel is treated with from 3.5 to 14.5 parts of a water insoluble inert wax by blending together a silica hydrogel with a wax selected from the group consisting of synthetic wax and microcrystalline wax, the improvement which comprises adding without dispersion or emulsification (a) 0.5 to 3.5 percent of a synthetic wax, and (b) 3–11 percent of a microcrystalline wax, wherein the percentages are based on treated hydrogel product, and the ratio of a:b is 1:1.5 to 1:12.

Another object relates to the process described above and the product resulting therefrom wherein the synthetic wax has a melting point in the range of 185° to 257° F, a molecular weight in the range of 500 to 20,000 and is preferably selected from the group consisting of polyethylene wax, vinylacetate/ vinyl alcohol wax, polyvinylacrylate wax, polypropylene wax and mixtures thereof.

A further object is a process and product wherein the wax treated silica hydrogel contains 1 percent by weight of a polyethylene wax of molecular weight 2,000 and 6 percent by weight of a microcrystalline wax having a melting point in the range of 190° to 201° F.

An additional object is a flatting agent comprising 88–99 percent of a silica selected from the group consisting of aerogel and hydrogel, and 1–12 percent of a wax mixture consisting of a. a synthetic wax selected from the group consisting of polyethylene wax, polyvinylacetate, polyvinylalcohol, polypropylene wax or mixtures thereof; and b. a microcrystalline wax;

wherein the ratio of a:b is from 1:15 to 1:12.

Other objects including the process for preparation of the above aerogel and hydrogel products will be apparent from the following discussion and best mode Examples.

The component waxes may be added to the silica base by sequential charging of the individual waxes to the mill containing the silica or by preblending the component waxes prior to addition to the mill. Fluid energy milling techniques are preferred. It is understood that the component waxes are added to the preformed silica gel in a substantially dry state process. By dry state is meant a process wherein the wax is added to the silica in the absence of water, aqueous solutions or suspensions of the waxes, and aqueous suspensions of the silica gels. The dry state process specifically excludes the use of separate emulsifiers, suspending and dispersion agents in the formation of the wax treated silica product. The present process does encompass the use of solid waxes, wax powders, prilled wax added directly to the mill or as paste or fluid after heating or melting such wax or mixtures thereof. The techniques of fluid energy milling are well known in the silica art. The mill is preferably operated with air or steam as the grinding fluid but other inert gases or mixtures thereof would be satisfactory although more expensive. The milling is continued until a product having the desired particle size is obtained with particle size range of 1–20 microns being preferred for most coating application uses. The silica bases most desirable for the present invention are those known in the art as silica hydrogels and silica aerogels. The properties of the treated aerogels will vary somewhat in relation to the preparative method used. Although the treated gels are useful for many industrial purposes, the gels of the present invention are especially advantageous as flatting agents in coatings such as industrial lacquers, varnishes for wood furniture and paneling including nitrocellulose, alkyd-amine conversion finishes, urethanes and air dry alkyds, pigmented thermosetting appliance finishes, baked finishes for metal and coil coating applications.

Suitable microcrystalline waxes for the practice of this invention include chemically inert, microcrystalline petroleum waxes known to the art and exemplified in U.S. Pat. No. 2,838,413. Especially preferred are the commercial waxes such as Crown Wax 700 and Be Square 195.

Suitable synthetic waxes are conventional polyolefin waxes, particularly those based on ethylene, propylene, vinylacetate, vinylalcohol and vinylacrylate polymers, copolymers of the above type and mixtures thereof. It is understood that for some applications, mixtures of different polyolefin waxes having diverse molecular weights within range herein specified will be suitable as well as particular mixtures of the same polyolefin (i.e., molecular weights 2,000 and 9,000). For the present invention it is necessary that the synthetic wax be water-insoluble wax having a molecular weight in the range of 500 to 18,000 and preferably from 1,000 to 3,500 and melting point within the range of 185° to 265° F., preferably within the range of 235°–257° F. It is a further requirement that the synthetic waxes or mixtures thereof be used in a dry process for treating the various silica bases as explained above, namely the wax treatment must be entirely free from the use of emulsifiers and dispersing agents and must exclude all wet processes wherein the wax is formulated and added as an aqueous suspension or dispersion and/or the silica is used in an aqueous carrier or suspension. Especially preferred for the practice of this invention are synthetic polyethylene waxes having a molecular weight of approximately 2,000.

With regard to the silica base which is combined with the above-described component waxes, the silica hydrogel products are presently commercially in demand for flatting purposes. However, processes are known within the art for the preparation of silica gels of different properties and characteristics, including the aerogels. Novel products incorporating the above-described mixtures of component waxes in conjunction with aerogels have been prepared and found useful as flatting agents, fillers, suspending agents in the coating and plastic arts. An aerogel is prepared by micronizing in a fluid energy mill a wet silica gel at high temperature. The highly porous aerogel is treated in a manner similar to that exemplified above for hydrogels. The resulting dry powder aerogel containing from 1 to 16 weight percent of the component microcrystalline/synthetic waxes are particularly advantageous for imparting "silky" appearance to coated articles.

The following specific examples illustrate only a limited number of embodiments; accordingly, the invention is not limited thereto. All parts and percentages being by weight, temperatures degrees Fahrenheit, and molecular weights reported as number average molecular weights unless otherwise specified.

EXAMPLE 1

A silica hydrosol was prepared by combining a 36.0° Baume sulfuric acid solution with a 32.1° Baume sodium silicate solution ($Na_2O:SiO_2$ mole ratio 1:3.22). The hydrosol was allowed to set to a hydrogel, sized, and washed with hot water then aged with a hot ammonia solution. The solution was drained and the silica gel was dried in a rotary drier. The silica gel (93 parts) was charged simultaneously with a blended mixture of 6 parts prilled microcrystalline wax (Be Square brand) having a melting point in the range of 193°–198° F and 1 part prilled polyethylene wax (Bareco Polywax 2000) into a heated fluid energy mill. The resulting fine particle sized silica gel had the following physical properties:

| | |
|---|---|
| Loss on Ignition (1000° C) | = 10.50 |
| pH (5% slurry in water) | 7.05 |
| Surface Area | 321 square meters/gram |
| Oil Absorption | 193 lbs/100 lbs |
| Particle Size (Coulter Counter) | 5.3 microns |

The physical properties of the product, Example 1 differ significantly from the prior art products and from the commercially available flatting products as demonstrated by the direct comparison of the known and/or published values shown in Table 2.

EXAMPLE 2

The fine particle silica prepared according to Example 1 was formulated in an alkyd urea varnish (2A) as follows:

| | Parts by Weight |
|---|---|
| Non-Drying Alkyd-Coconut (60% non-volatile) | 39.7 |
| Urea-Formaldehyde Resin (60% non-volatile) | 26.5 |
| Xylene | 15.1 |
| N-Butanol | 13.9 |
| Fine Particle Silica | 4.8 |

All of the ingredients, except silica, were mixed together with a disperser at low speed. The silica was dispersed into the system using a high speed disperser. The Grind Viscosity (cps) was taken on the Brookfield LVT Viscometer using spindle #4 at 60 RPM and 77° F. For gloss evaluation the flatted lacquer was drawn-down on black Carrara glass plates using a 0.003 inches Bird Applicator, allowed to flash 45 minutes and then baked for 45 minutes at 150° F. After cooling, the panels were read for gloss values on the Lockwood and McLorie Model AJ3 glossmeter.

The varnish (2A) possessed outstanding soft settling and gloss characteristics. Varnish 2A was compared directly with an identical formulation using a commercial flatting agent (Syloid 166) and designated as Standard 2B in Table 1. Varnish 2A is not only superior to the standard in flatting characteristics but gives a suspension rating of 2 (very soft) in contrast to the rating of 6 (hard settling) for the standard. In a separate experiment, the fine particle silica formulated as an alkyd urea varnish 2C was compared with an identical formulation at equivalent loading of a fine particle silica treated with only microcrystalline wax (12% by total weight) designated as Standard 2D.

TABLE I

| Experiment No. | 2A | Standard 2B | 2C | Standard 2D | 4A | Standard 4B |
|---|---|---|---|---|---|---|
| Mill Loading (%) | 21.0 | 19.0 | 25.74 | 25.74 | 7.4 | 7.4 |
| Grind Hegman | 5.5 | 5.5 | 5+ | 5+ | 6 | 6+ |
| Grind Viscosity (cps) | 5750 | 5500 | 8000 | 6700 | — | — |
| Grind Paste Color | Lighter | Std. | Equal | Std. | — | — |
| Gloss: | | | | | | |
| 60° | 10 | 12 | 16 | 19 | 15 | 17 |
| 85° | 20 | 22 | 27 | 36 | 26 | 26 |
| Visual | Flat | Std. | Flat | Std. | Sl. Flat | Std. |
| Film Appearance | Equal | Std. | Equal | Std. | Sl. Fine | Std. |

TABLE I-continued

| Experiment No. | 2A | Standard 2B | 2C | Standard 2D | 4A | Standard 4B |
|---|---|---|---|---|---|---|
| Suspension[a] (1 month on shelf) | 2 | 6 | 2 | 4 | 1 | 5 |

[a]Suspension ratings:
1 Very very soft (no material remains on spatula)
2 Very soft (material flows off spatula)
3 Soft (material falls off spatula)
4 Soft/moderate (material remains on spatula)
5 Moderate (material on spatula has waxy consistency)
6 Hard (material on spatula has a hard white core)

EXAMPLE 3

The fine particle silica prepared according to Example 1 was formulated in a polyester coil coating as follows and designated as Example 3A.

|  | Parts By Weight |
|---|---|
| TiO$_2$ | 28.4 |
| Polyester Resin (70% N.V) | 44.6 |
| Melamine Resin (100% N.V.) | 3.4 |
| Melamine Resin (60% N.V.) | 1.8 |
| Flow Agent | 3.2 |
| Catalyst | .5 |
| Ethylene Glycol Monoethyl Ether Acetate | 3.6 |
| Diacetone Alcohol | 2.2 |
| Cyclohexanone | .5 |
| Ethylene Glycol Monobutyl Ether | .5 |
| Aromatic Solvent | 3.9 |
| Fine Particle Silica | 7.4 |

Gloss was evaluated by making a drawdown of the flatted paint on Parker Aluminum Panel, Bonderite 721 Treated using #28 Wire-Cator (Leneta Company). This was then baked without flashing for 90 seconds at 500° F, quenched in cold water, dried and the gloss read on the Lockwood and McLorie Model AJ3 glossmeter.

Flexibility was determined in a reverse impact test run on the Gardner Impact Tester. The T-Bend test is run by bending the panel upon itself over and over until no cracking is noted at the bend. The "T" refers to the thickness radius of the panel; the lower the "T" passed the better the flexibility.

Resistance to metal marking was evaluated by running a coin (preferably a nickel) across the surface of the coating and noted the mark imparted on it. A rating of 1 to 10 is given with 1 being the poorest and 10 the best (no mark).

The coil coating polyester formula 3A, incorporating the fine particle silica of Example 1, was compared directly with an identical formulation under equal loading of a commercial flatting agent (Syloid 166) and designated as Standard 3B. From the following table, it is seen that 3A has an improved mar resistance over Standard 3B. In a similar test 3A exhibited superior grind characteristics and better mar resistance than a polyester formula using untreated silica gel. The same 3A formulation was 15% more efficient in flatting properties than a similar formulation using a silica gel impregnated with only microcrystalline wax (12%).

|  | 3A | Standard 3B (Syloid 166) |
|---|---|---|
| Grind Hegman | 6 | 6 |
| Gloss: | | |
| 60° | 26 | 23 |
| 85° | 58 | 56 |
| Visual | = Std. | Std. |
| Flexibility: | | |
| Reverse Impact (inch/lbs) | 1 | 1 |
| T-Bend | 1½T | 1½T |
| Resistance to Metal Marking | > Std. | Std. |
| Film Appearance | = Std | Std. |

EXAMPLE 4

A fine particle silica prepared by the method described in Example 1 was incorporated into an oil alkyd varnish formulation (4A) as follows:

|  | Parts By Weight |
|---|---|
| Medium Oil Alkyd-Soya (50% N.V.) | 61.4 |
| Fine Particle Silica | 4.9 |
| Mineral Spirits, 66/3 | 32.4 |
| Driers | 1.2 |
| Anti-Skinning Additive | .1 |

The silica was dispersed in the alkyd with a high speed disperser and the remaining ingredients added under agitation. Gloss was evaluated as shown in Example 2. Formulation 4A, when compared at equal loading with a commercial flatting agent, exhibited superior flatting and film appearance (leveling) and greatly improved suspension characteristics.

EXAMPLE 5

When the experiment of Example 2 was repeated with the same quantities of the silica gel of Example 1 except that the microcrystalline wax and polyethylene wax were blended together prior to the addition to the fluid energy mill, equivalent flatting and settling properties were obtained in the varnish.

EXAMPLE 6

The fine particle silica of Example 1 was incorporated into a Nitrocellulose Lacquer formulation (6A) as follows:

|  | PBW= Parts by Weight |
|---|---|
| ½ sec. Nitrocellulose (70% N.V.) | 8.2 |
| ¼ sec. Nitrocellulose (70% N.V.) | 1.4 |
| Solvents | 25.6 |
| Latent Solvents | 8.6 |
| Diluents | 32.6 |
| Non-Drying Alkyd-Coconut (60% N.V.) | 20.4 |
| Plasticizer | 2.6 |
| Fine Particle Silica | .6 |

The nitrocellulose was dispersed in the diluents followed by addition of the solvents and latent solvents under agitation. After solution had been effected, alkyd and plasticizers were added under agitation and the silica then dispersed into the system using a high speed disperser. Grind Viscosity and Gloss were evaluated as indicated in Example 1. Test results, as listed below, show film gloss and appearance equal to the standard and excellent suspension characteristics (very soft) tested after 1 month storage.

| Mill Loading (%) | 21.0 |
| --- | --- |
| Grind Hegman | 5 |
| Grind Viscosity (cps) | 11,600 |
| Gloss: | |
| 60° | 26 |
| 85° | 38 |
| Suspension | 2 |

EXAMPLE 7

The fine particle silica prepared according to Example 1 was incorporated into a baking enamel (7A) as follows:

|  | Parts By Weight |
| --- | --- |
| Short Oil Alkyd-TOFA (50% N.V.) | 10.0 |
| Non-Drying Alkyd-Coconut (60% N.V.) | 27.1 |
| Urea-Formaldehyde Resin (50% N.V.) | 13.6 |
| TiO$_2$ | 23.5 |
| Xylene | 19.5 |
| N-Butanol | 3.5 |
| Fine Particle Silica | 2.8 |

The short oil alkyd, non-drying alkyd, titanium dioxide and N-butanol were sandmilled to a Hegman 7- grind. After the urea-formaldehyde resin and xylene were added under agitation, the silica was dispersed with a high speed disperser.

Color values were obtained by drawing down the flatted baking enamel paint on electrolytic tin plate using a 0.006 inch Bird Applicator, allowing to flash 60 minutes and then baking the panels for 30 minutes at 325° F. Readings were then made on the Hunter D-25 Color and Color Difference Meter.

Opacity values were obtained from drawdowns using a 0.002 inch Bird Applicator made on black and white Leneta cards, flashed 5 minutes and baked 4 minutes at 325° F. Readings were likewise taken on the Hunter D-25 Color and Color Difference Meter.

For gloss, measurements were made by evaluating 0.002 inch wet film thickness drawdowns on glass plate using the Lockwood and McLorie Model AJ3 glossmeter. The wet drawdowns were flashed 20 minutes and baked for 20 minutes at 325° F.

Baking formulation 7A gave color and opacity properties equal or superior to the commercial flatting agent similarly formulated and identified as Standard 7B (Syloid 166).

|  | 7A | 7B |
| --- | --- | --- |
| Color:* | | |
| Y (brightness) | 88.1 | 88.1 |
| a (−green;+red) | −1.8 | −1.9 |
| b (−blue;+yellow) | +4.1 | +4.2 |
| % Y of Std. | 100.0 | 100.0 |
| Δ b from Std. | 0.1 blue | 0.0 |
| Opacity: ** | | |
| Contrast Ratio | 93.90 | 94.40 |
| C.R. % of Std. | 99.5 | 100.0 |
| Hegman, fineness of grind | 6 | 6 |

EXAMPLE 8

A fine particle silica prepared according to Example 1 but using 3 parts of the microcrystalline wax and 0.5 part of the polyethylene wax was identified as Example 8A. A similar preparation using 9 parts of microcrystalline wax and 1.5 parts of polyethene wax was identified as Example 8C. A third preparation using identical waxes in amounts equal to those of Experiment 1 (ratio 6:1) was identified as Example 8D. Formulation of each of the above in a polyester coating as indicated in Example 3 was followed by a direct evaluation using a commercial flatting agent as (Syloid 166) Standard, identified as Example 8B. The flatting characteristics at 85° of each of the modified products were superior to the Standard.

|  | STANDARD | | | |
| --- | --- | --- | --- | --- |
|  | 8A | 8B | 8C | 8D |
| Hegman | 5½ | 5 | 5 | 5 |
| Gloss | | | | |
| 60 | 25 | 21 | 22 | 21 |
| 85 | 50 | 53 | 48 | 48 |

EXAMPLES 9 through 12

Fine particle silicas were prepared according to the procedure of Example 1 with the exception that microcrystalline wax C-700 (Crown) having a melting point of 196° to 201° F was used in conjunction with the polyethylene wax in the following ratios:

| Example No. | 9 | 10 | 11 | 12 |
| --- | --- | --- | --- | --- |
| Crown C-700 | 11.0 | 6.0 | — | — |
| Be Square 195 | — | — | 3.0 | 9.0 |
| Polywax 2000 | 1.0 | 1.0 | 0.5 | 1.5 |

Evaluation of the products of Examples 9 through 12 in a polyester coil coating and in an alkyd urea formula gave suspension and mar resistance superior to that shown by commercial flatting agents formulated at equivalent weights.

TABLE 2

Comparison of Physical Properties of Improved Flatting Agents With Commercial Flatting Agents

| Product | Example 1 | Syloid*** 166 | Degussa**** OK-412 |
| --- | --- | --- | --- |
| SiO$_2$ content | 99.6* | 99.7* | > 87 |
| Carbon content | — | — | 3* |
| Drying loss | — | — | <5 |
| Loss on ignition | 9.5 | 14% | <12* |
| pH(water) | 7.0 | 7.0 | ca 6 |
| Specific gravity | 2.0 | — | ca 1.9 |
| Oil absorption (lbs oil/100 lbs.) | 193 | 230 | 230 |
| Refractive index | — | — | 1.45 |
| Bulk density (lbs/cu. ft.) | — | 7 | 6 |
| Bulking Value (lbs./solid gallon) | — | 16.4 | — |

*dried 2 hrs. at 105° C
**Ignited basis
***W. R. Grace brand wax modified silica
****Deutsche Gold-und Silber-Schneideanstalt Vormals Roessler brand wax modified silica

EXAMPLE 13

651 parts of a Aerogel such as G-100, (Glidden-Durkee brand) combined with 42 parts of microcrystalline wax C-700 (Petrolite brand) and 7 parts Polywax 2000 (Bareco brand polyethylene wax) were blended in a Vee Blender for 10 minutes and then transferred and milled in a fluid energy mill (600° F). Analysis showed a free moisture content of 3.81 percent (drying at 110° F) and a wax content of 7.58 percent (basis dried sample).

Formulation of the wax treated aerogel as a nitrocellulose lacquer at a mill loading of 13.29 percent according to the method of Example 6 gave a coating having a Hegman Grind of 6+ and a viscosity of 4800 cps. The drawdown film was rated excellent with 60° and 85° Gloss readings of 8.6 and 38 respectively.

What is claimed is:

1. In a process for producing a silica flatting agent, wherein a silica hydrogel is treated with from 3.5 to 14.5 parts of a water insoluble inert wax by blending together a silica hydrogel with a wax selected from the group consisting of synthetic wax and microcrystalline wax, the improvement which consists essentially of adding to the silica in a dry process free of water dispersion or emulsification a mixture of waxes consisting of (a) 0.5 to 3.5 percent of a synthetic wax, and (b) 3–11 percent of a microcrystalline wax, wherein the percentages are based on treated hydrogel product, and the ratio of a:b is 1:1.5 to 1:12.

2. The process of claim 1 wherein the synthetic wax is a wax having a melting point in the range of 187° to 257° F and selected from the group consisting of polypropylene wax, and polyethylene wax.

3. The process of claim 2 wherein the synthetic wax is a polyethylene wax having a molecular weight in the range of 500 to 4,000.

4. The process of claim 3 wherein the wax treated silica hydrogel contains 1 percent by weight of polyethylene wax of molecular weight 2,000 and 6 percent by weight of microcrystalline wax having a melting point in the range of 190°–201° F.

5. The product resulting from the process of claim 1.

6. A flatting agent consisting essentially of 88–99 percent of a silica aerogel, and 1–12 percent of a wax mixture consisting of
   a. a synthetic wax selected from the group consisting of polyethylene wax, polyvinylacetate, polyvinylalcohol, polypropylene wax or mixtures thereof; and
   b. a microcrystalline wax;

wherein the ratio of a:b is from 1:1.5 to 1:12.

7. A process for preparing a silica flatting agent which consists essentially of treating under milling conditions 86 to 99.5 parts of a silica aerogel with 0.5 to 14 parts of a wax mixture consisting of
   a. a synthetic wax selected from the group consisting of polyethylene wax, polypropylene wax and mixtures thereof, said waxes having melting point in the range of 225° to 280° F and a molecular weight in the range of 500 to 4500;
   b. a microcrystalline wax;

wherein the ratio of a:b is from 1:1.5 to 1:12.

8. The flatting agent of claim 6 wherein the wax mixture consists of 4.0 to 7.0 parts of a microcrystalline wax and 0.5 to 3.5 parts of a polyethylene wax having a molecular weight of 2,000.

* * * * *